United States Patent [19]

Mashino et al.

[11] Patent Number: 4,788,486
[45] Date of Patent: Nov. 29, 1988

[54] VEHICULAR POWER SUPPLY SYSTEM HAVING A PLURALITY OF POWER SUPPLY VOLTAGES

[75] Inventors: Keiichi Mashino; Souju Masumoto, both of Katsuta, Japan

[73] Assignees: Hitachi, Ltd.; Hitachi Automotive Eng. Co., both of Tokyo, Japan

[21] Appl. No.: 12,994

[22] Filed: Feb. 10, 1987

[30] Foreign Application Priority Data

Feb. 14, 1986 [JP] Japan .................................. 61-28833
Jun. 13, 1986 [JP] Japan ................................ 61-135984

[51] Int. Cl.⁴ ................................................ H02J 7/14
[52] U.S. Cl. ...................................... 320/17; 322/28; 322/90
[58] Field of Search ................................ 320/15–17; 322/28, 33, 90, 94

[56] References Cited

U.S. PATENT DOCUMENTS

| | | | |
|---|---|---|---|
| 3,710,226 | 1/1973 | Seike | 320/15 |
| 3,809,995 | 5/1974 | Hardin | 322/90 X |
| 3,922,592 | 11/1975 | Quantz | 320/15 |
| 4,045,718 | 8/1977 | Gray | 320/17 |
| 4,088,943 | 5/1978 | Schmidt | 322/94 X |
| 4,335,344 | 6/1982 | Gant | 322/28 X |
| 4,517,507 | 5/1985 | Nordbrock et al. | 322/28 |
| 4,563,631 | 1/1986 | Mashino et al. | 322/33 |

Primary Examiner—R. J. Hickey
Attorney, Agent, or Firm—Antonelli, Terry & Wands

[57] ABSTRACT

A vehicular power supply system having a plurality of power supply voltages comprises a generator including first and second armature windings electrically isolated from each other and a field winding, a first rectifier unit converting a first a.c. output of the first armature windings into a first d.c. voltage, a second rectifier unit converting a second a.c. output of the second armature windings into a second d.c. voltage, a first battery connected to an output terminal of the first rectifier unit, a second battery connected in series with the first battery and connected also to an output terminal of the second rectifier unit, a first voltage regulator detecting the terminal voltage of the first battery thereby controlling current supplied to the field winding of the generator, a second voltage regulator detecting a mean voltage of the second battery thereby controlling on-off of a power switching element connected between the second battery and the second rectifier unit, the second voltage regulator acting to decrease the conduction ratio of the power switching element when the mean voltage of the second battery is high but to increase the conduction ratio when the mean voltage is low.

6 Claims, 4 Drawing Sheets

VEHICULAR POWER SUPPLY SYSTEM HAVING A PLURALITY OF POWER SUPPLY VOLTAGES

BACKGROUND OF THE INVENTION

This invention relates to a vehicular power supply system, and more particularly to a power supply system of the kind described above which is suitable for supplying two different d.c. voltages.

In a cold district, it is especially difficult to start an engine of a vehicle such as a car or a truck which runs outdoors in the winter season. Such a difficulty is attributable to an increased viscosity of engine oil, degradation of the ignitability of fuel, etc.

A power supply system which obviates such a difficulty is disclosed in, for example, U.S. Pat. No. 4,045,718. According to the disclosure of this United States patent, two 12-volt batteries commonly used as a power source are connected in series to provide a power source of 24 volts, and this 24-volt power source is used to drive a starting motor for starting an engine, thereby enhancing the starting efficiency of the motor so that the engine can be made easy to start.

In this prior art, the voltage regulator is provided only for 12-volt output to maintain thereof, and no voltage regulation is made on another voltage output of the generator.

Therefore, the voltage changed in the second battery tends to change depending on the value of current flowing through the second set of armature windings, that is, depending on the relative magnitude of 24-volt output current. Thus, although a self-current limiting function similar to that of a conventional automatic generator works, the diameter of the conductors of the second set of armature windings cannot be decreased beyond a limit from the aspect of the resistance against vibration, and, for the above reason, an output having an excessive margin relative to the rated output tends to appear from the second set of armature windings. Consequently, such a problem has arisen frequently in which flow of an excessively large current through the high-voltage (24 volts) supply side of the system results in objectionable thermal breakdown of the elements including the associated rectifier. Further, there has been the tendency that the second battery is overcharged or undercharged.

SUMMARY OF THE INVENTION

With a view to solve the prior art problems pointed out above, it is a primary object of the present invention to provide a vehicular power supply system in which means are provided for inhibiting flow of an excessively large current through a high-voltage supply side of the system, thereby preventing thermal breakdown of elements including an associated rectifier and controlling the voltage applied to a second battery, so as to properly charge the second battery.

In accordance with the present invention which attains the above object, there is provided a vehicular power supply system comprising a generator including a first set of armature windings and a second set of armature windings electrically isolated from each other, and a field winding supplying magnetic flux to the first and second sets of armature windings; first rectifier means connected to the first set of armature windings of the generator to convert a first a.c. output of the first set of armature windings into a first d.c. voltage; second rectifier means connected to the second set of armature windings of the generator to convert a second a.c. output of the second set of armature windings into a second d.c. voltage; a first battery connected to an output terminal of the first rectifier means to supply power to an electrical load connected thereto and to be charged by the output of the first rectifier means; a second battery connected in series with the first battery and connected also to an output terminal of the second rectifier means to supply power to an electrical load connected thereto and to be charged by the output of the second rectifier means; a first voltage regulator detecting the terminal voltage of the first battery thereby controlling current supplied to the field winding of the generator so as to maintain constant the terminal voltage of the first battery; and a second voltage regulator connected between the second battery and the second rectifier means to regulate the charged voltage of the second battery, the second voltage regulator including switching means connected between the second battery and the second rectifier means, means for comparing the voltage of the second battery with a predetermined reference value, and conduction ratio control means for controlling on-off of the switching means according to the result of comparison by the comparing means.

DESCRIPTION OF THE PREFERRED EMBODIMENTS

Figure 1:
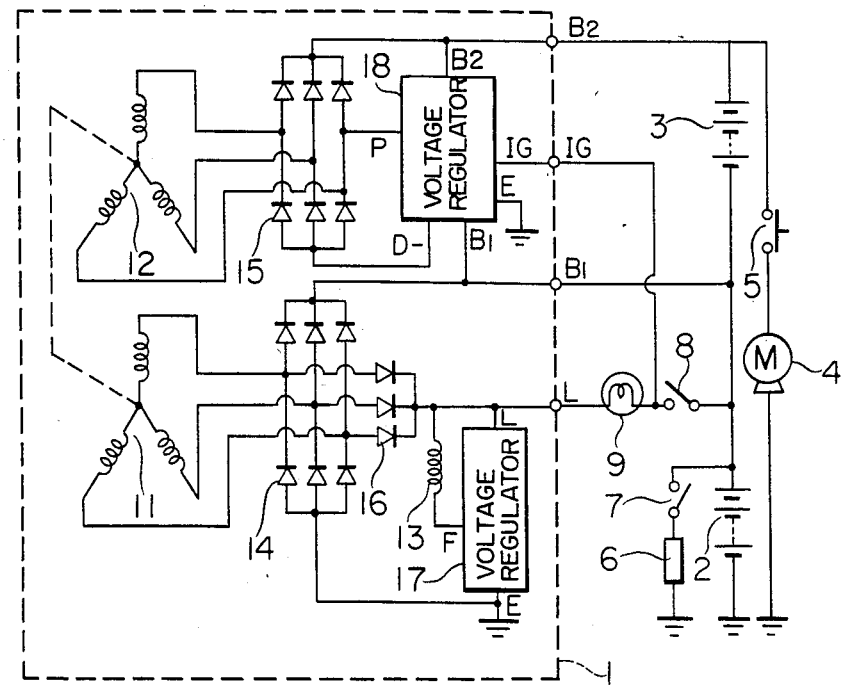
FIG. 1 is a block diagram showing the general structure of an embodiment of vehicular power supply system according to the present invention.

A preferred embodiment of the vehicular power supply system according to the present invention will be described with reference to FIG. 1. Referring to FIG. 1, a generator 1 is driven by an engine (not shown) of a vehicle. A first battery 2 is charged through a first output terminal $B_1$ of the generator 1. A second battery 3 is charged throiugh a second output terminal $B_2$ of the generator 1. Each of the first and second batteries 2 and 3 is a 12-volt lead accumulator in which six 1.5-volt cells are connected in series. A starting motor 4 operates when a starter switch 5 is turned on. An electrical load 6, for example, an auxiliary equipment including vehicle's headlights is connected to the first battery 2 through an on-off switch 7. When a key switch 8 is turned on, power required for maintaining the vehicle in its running condition is supplied. A charging warning lamp 9 is lit in the event of occurrence of trouble in the charging system. The generator 1 includes a first set of armature windings 11 and a second set of armature windings 12 which are wound in electrically isolated relation to generate a first a.c. output and a second a.c. output respectively induced by magnetic flux supplied from a field winding 13. A first rectifier 14 and a second rectifier 15 convert the a.c. outputs of the first and second sets of armature windings 11 and 12 into a first d.c. voltage and a second d.c. voltage respectively. An auxiliary rectifier 16 supplies field current to the field winding 13. A first voltage regulator 17 controls the current of the field winding 13 to regulate the first output voltage. A second voltage regulator 18 regulates the second output voltage in a manner as will be described in detail later.

Figure 2:
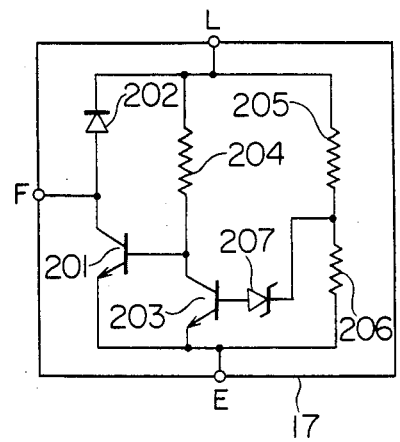
FIG. 2 is a circuit diagram showing in detail the structure of the first voltage regulator shown in FIG. 1.
Figure 3:
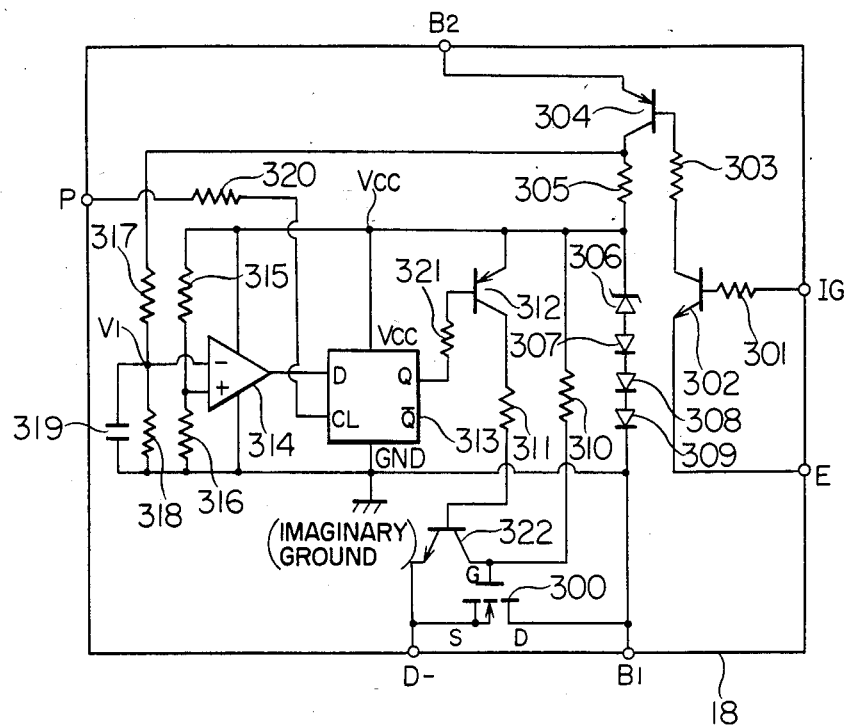
FIG. 3 is a circuit diagram showing in detail the structure of the second voltage regulator shown in FIG. 1.

FIG. 2 shows in detail the internal structure of the first voltage regulator 17. This first voltage regulator 17 is composed of a power transistor 201, a diode 202, a transistor 203, resistors 204, 205, 206, and a Zener diode 207. FIG. 3 shows in detail the internal structure of the second voltage regulator 18. This second voltage regulator 18 is composed of an N-channel power FET 300, NPN transistors 302, 322, PNP transistors 304, 312, a Zener diode 306, diodes 307, 308, 309, resistors 301, 303, 305, 310, 311, 315, 316, 317, 318, 320, 321, a capacitor 319, a D-type flip-flop 313, and a comparator 314.

The circuitry of the second voltage regulator 18 will be described in further detail. The connection point between the series-connected diodes belonging to one phase (the rightmost two diodes in FIG. 1) among the total of six diodes constituting the second rectifier 15 shown in FIG. 1 is connected through a terminal P and the resistor 320 to a clock input terminal CL of the D-type flip-flop 313. The positive terminal of the second battery 3 is connected through the second output terminal B$_2$ to the emitter of the PNP transistor 304, and the base of this transistor 304 is connected through the resistor 303 to the collector of the NPN transistor 302 which is connected at its base to a terminal IG through the resistor 301 and at its emitter to a terminal E. The collector of the transistor 304 is connected through a series connection including the resistor 305, Zener diode 306 and three diodes 307, 308, 309 to the first output terminal B$_1$ connected to the positive terminal of the first battery 2. The collector of this transistor 304 is also connected to a minus (−) input terminal of the comparator 314 through the resistor 317. One end of the series connection of the Zener diode 306 and three diodes 307 to 309 is connected to an imaginary grounding terminal Gnd, and a voltage Vcc appears at the other end of the series connection. This voltage Vcc is connected to a power supply terminal of the D-type flip-flop 313 and also to that of the comparator 314. Further, this voltage Vcc is divided by the series-connected resistors 315 and 316, and the divided voltage is applied to a plus (+) input terminal of the comparator 314. A smoothing circuit provided by a parallel connection of the resistor 318 and the capacitor 319 is connected between the minus (−) input terminal of the comparator 314 and the imaginary grounding terminal Gnd. The comparator 314 is connected at its output terminal to an input terminal D of the D-type flip-flop 313.

An output terminal Q of the D-type flip-flop 313 is connected through the resistor 321 to the base of the PNP transistor 312 which is connected at its emitter to the terminal at which the voltage Vcc appears. The collector of this PNP transistor 312 is connected to the base of the NPN transistor 322. The voltage Vcc is also applied through the resistor 310 to the collector of this transistor 322 which is connected at its emitter to a terminal D-. The gate and source of the N-channel power FET 300 are connected between the emitter and the collector of the NPN transistor 322, and the drain of this FET 300 is connected to the first output terminal B$_1$.

Figure 4:
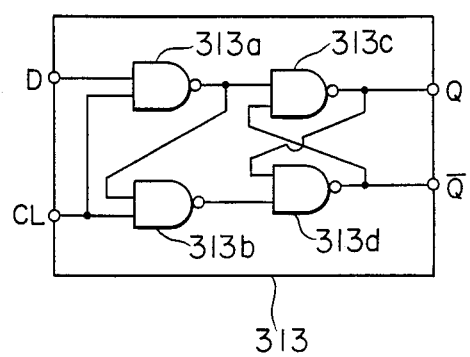
FIG. 4 is a circuit diagram showing in detail the structure of the D-type flip-flop shown in FIG. 3.

FIG. 4 shows the internal structure of the D-type flip-flop 313. This flip-flop 313 is composed of NAND gates 313a, 313b, 313c and 313d.

The operation of the charging system for starting a vehicle will now be described. When the key switch 8 is turned on, current from the first battery 2 flows through the key switch 8, charging warning lamp 9, field winding 13 and a power transistor 201 to turn on the charging warning lamp 9 and to excite the field winding 13. Then, when the starter switch 5 is turned on, the starting motor 4 starts to rotate. Since, at this time, the batteries 2 and 3 are connected in series, the voltage of 24 volts is applied across the starting motor 4. When the engine rotation is started by the rotation of the starting motor 4, the field winding 13 generates a rotating magnetic field thereby inducing an A.C. voltage in the armature windings 11 and 12. The A.C. voltage induced in the first armature windings 11 is rectified by the first rectifier 14 which charges the first battery 2 through the first output terminal B$_1$ and supplies power to the electrical load 6. Also, an exciting current is supplied from the auxiliary rectifier 16 to the field winding 13 to place the field winding 13 in a self-exciting state. On the other hand, the conduction of the auxiliary rectifier 16 decreases the voltage applied across the charging warning lamp 9 until the lamp 9 is finally deenergized.

The first voltage regulator 17 controls the voltage appearing at the terminal L to maintain the voltage constant in a manner as described now. When the voltage appearing at the terminal L is low, the voltage divided by the resistors 205 and 206 is not high enough to cause breakdown of the Zener diode 207, and the transistor 203 is in its off state. Base current is supplied through the resistor 204 to the power transistor 201 to turn on the power transistor 201 thereby energizing the field winding 13 and increasing the field current. When the field current increases, the voltage induced in the first armature windings 11 increases. As a result, the voltage appearing at the terminal L increases until it attains a predetermined voltage level which causes breakdown of the Zener diode 207. The transistor 203 is turned on, and since no base current is supplied to the power transistor 201, the power transistor 201 is turned off. The field current flows now through the diode 202 and is attenuated. As a result, the voltage induced in the first armature windings 11 decreases, and the voltage appearing at the terminal L decreases.

Such a sequence is repeated for the on-off control of the power transistor 201 thereby maintaining constant the voltage appearing at the terminal L.

Although the voltage induced in the second armature windings 12 is equivalent to that induced in the first armature windings 11, a higher output voltage is generated when the number of turns of the second armature windings 12 is selected to be larger than that of the first armature windings 11. The second voltage regulator 18 operates to control on-off of the power FET 300 thereby regulating the voltage charged in the second battery 3 in a manner as described now.

When the key switch 8 is turned on, the NPN transistor 302 is turned on through the resistor 301, and base current is supplied through the resistor 303 to the PNP transistor 304 to turn on this transistor 304. The collector current from the PNP transistor 304 flows through the resistor 305, and the constant voltage Vcc is generated by the constant voltage circuit composed of the Zener diode 306 and diodes 307, 308, 309. The second voltage regulator 18 controls the voltage charged in the second battery 3. Herein, the terminal $B_1$ is considered as an imaginary grounding terminal as shown in FIG. 3 and is distinguished from the grounding terminal E shown in FIG. 1.

When the saturation voltage of the PNP transistor 304 is neglected, a voltage $V_1$ appearing at the voltage dividing point of the resistors 317 and 318 is proportional to the voltage of the second battery 3. This voltage $V_1$ is smoothed by the capacitor 319, and the averaged voltage is applied to the minus or inverted input terminal of the comparator 314.

Figure 5:
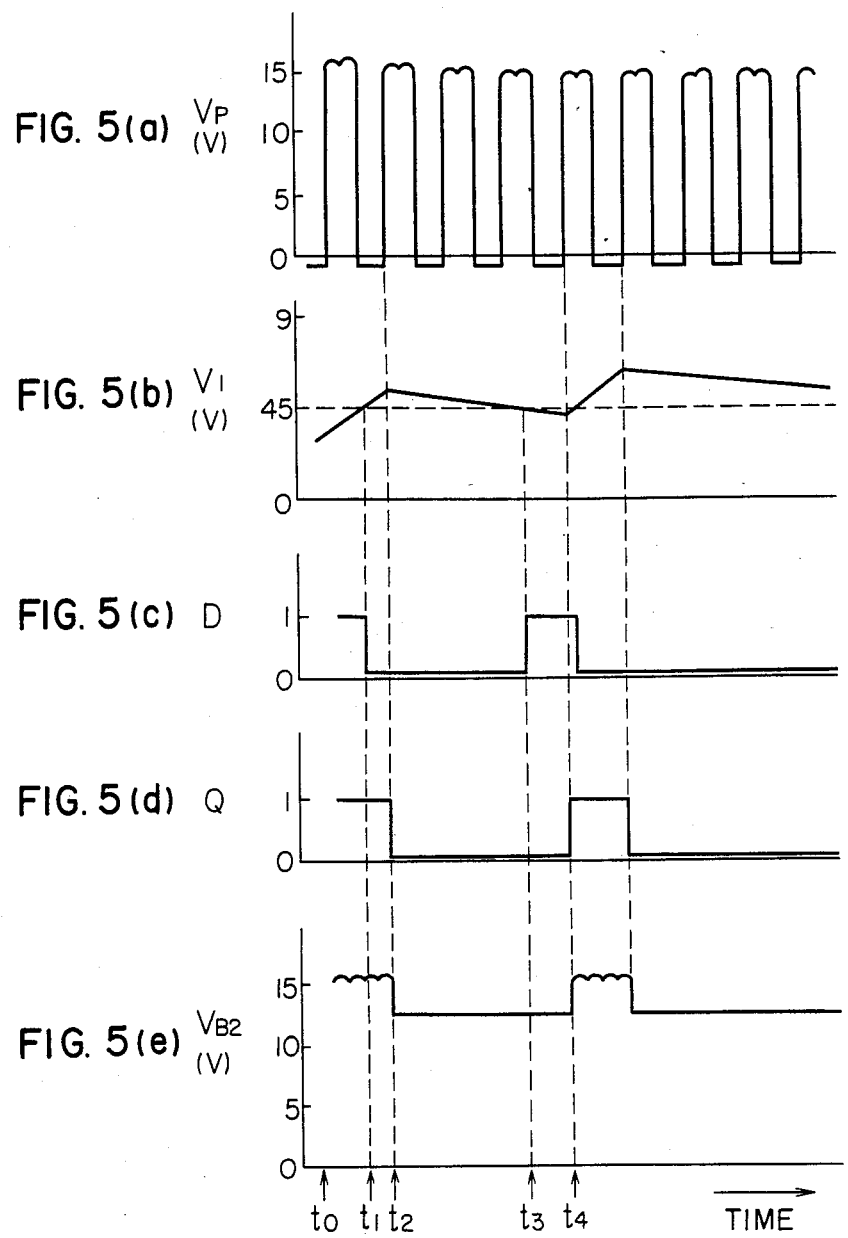
FIGS. 5(a)–5(e) are waveform diagrams for illustrating the operation of the second voltage regulator shown in FIG. 3.

FIG. 5 shows operating waveforms appearing at various parts of the second voltage regulator 18 shown in FIG. 3. In all of waveforms shown in FIG. 5, the voltage at the imaginary grounding terminal $B_1$ is assumed to be zero volts. A voltage waveform $V_P$ appearing at the terminal P is shown in (a) of FIG. 5. This terminal P is connected to one phase of the second armature windings 12. Thus, as shown in (a) of FIG. 5, this voltage $V_P$ of alternating high and low levels acting as a clock signal appears at the terminal P with the rectifying operation of the second rectifier 15, and the period of the voltage $V_P$ changes depending on the rotation speed of the engine. FIG. 5 shows in (b) the waveform of the voltage $V_1$ applied to the inverted input terminal of the comparator 314. Suppose now that the power supply voltage Vcc of the constant voltage circuit is 9 volts, and the resistors 315 and 316 dividing the voltage Vcc have the same resistance value. In this case, the output of the comparator 314 changes relative to the threshold level of 4.5 volts. At time $t_0$ in FIG. 5, the voltage $V_1$ is lower than 4.5 volts, and the output of the comparator 314 is in its high level. The output of the comparator 314 is connected to the input terminal D of the D-type flip-flop 313. FIG. 5 shows in (c) a digital level at this terminal D. The D-type flip-flop 313 has an internal structure as described already with reference to FIG. 4, and the operation of such a flip-flop is commonly well known in the art and will not be described in detail herein. Briefly describing, a signal applied to the input terminal D of the flip-flop 313 is transferred to its output terminals Q and $\overline{Q}$ (a "not" of Q) in response to the leading edge of the clock signal applied to its clock input terminal cL, and the signal levels at the output terminals Q and $\overline{Q}$ are maintained until the clock signal is applied again to the clock input terminal cL. FIG. 5 shows in (d) the digital level at the output terminal Q of the D-type flip-flop 313. When the digital level at the output terminal Q is "1" at time $t_0$, the PNP transistor 312 is in its off state, and the NPN transistor 322 is also in its off state. At this time, a voltage sufficiently higher than that applied to the source S is applied to the gate G of the power FET 300 through the resistor 310. The power FET 300 is turned on, and the terminal D- is connected to the terminal $B_1$ to charge the second battery 3. As shown in (e) of FIG. 5, a voltage $V_{B2}$ is applied across the second battery 3 at time $t_0$. As the second battery 3 is continuously charged with time, the voltage $V_1$ increases due to the charge stored in the capacitor 319. When the voltage $V_1$ attains the threshold level of 4.5 volts at time $t_1$, the output of the comparator 314 is inverted, and "0" is applied to the input terminal D of the D-type flip-flop 313. However, since the clock signal is not applied to the clock input terminal CL at time $t_1$, "1" is maintained at the output terminal Q, and the power FET 300 is maintained in its on state to conitinously charge the second battery 3. At time $t_2$, the voltage $V_P$ applied to the terminal P turns into its high level to apply the clock signal to the clock input terminal cL of the D-type flip-flop 313, and the digital level at the output terminal Q is changed from "1" to "0". As a result, the PNP transistor 312 is turned on to turn on the NPN transistor 322, and the gate-source voltage of the power FET 300 decreases until finally the power FET 300 is turned off. As a result, the voltage $V_{B2}$ charged in the second battery 3 decreases to its open-circuit voltage level of about 12.5 volts. Due to the decrease of the battery voltage $V_{B2}$ at time $t_2$, the voltage $V_1$ decreases gradually from time $t_2$. At time $t_3$, the voltage $V_1$ decreases to the threshold level of 4.5 volts, and the output of the comparator 314 turns into "1" from "0". At time $t_4$, the voltage $V_P$ turns into its high level to apply the clock signal to the clock input terminal cL of the D-type flip-flop 313, and the digital level at the output terminal Q changes from "0" to "1". Therefore, the power FET 300 is turned on at time $t_4$, and the second battery 3 is charged again.

By the repetition of the operation described above, the power FET 300 is repeatedly turned on-off for chopper control. As described above, the threshold level of the voltage $V_1$ is 4.5 volts, and the voltage $V_1$ is regulated to be maintained at 4.5 volts in its mean value relative to time. By suitably selecting the voltage division ratio of the resistors 317 and 318, the mean value of the voltage $V_{B2}$ of the second battery 3 can be freely set.

The power supply voltage Vcc of the constant voltage circuit, which changes depending on the temperature characteristics of the Zener diode 306 and diodes 307, 308 and 309, is expressed as follows:

$$Vcc = V_Z + 3 \cdot V_F \quad (1)$$

where
  $V_Z$: Zener voltage of the Zener diode 306
  $V_F$: Forward voltage of each of the diodes 307, 308 and 309.

The amount of voltage change relative to time is expressed as follows:

$$\frac{\partial Vcc}{\partial T} = \frac{\partial V_Z}{\partial T} + 3 \cdot \frac{\partial V_F}{\partial T} \quad (2)$$

Suppose now that the Zener diode 306 and diodes 307, 308, 309 employed in the voltage regulator 18 have the following characteristics:

$V_Z = 7.05$ V $\frac{\partial V_Z}{\partial T} = 0.4$ mV/°C.

$V_F = 0.65$ V $\frac{\partial V_F}{\partial T} = -2$ mV/°C.

Then, the following values are obtained:

$\partial Vcc/\partial T = -5.6$ mV/°C

Vcc = 9 V (at room temperature)

Thus, the voltage $V_1$ is high at low temperatures, and the charged voltage $V_{B2}$ of the second battery 3 increases.

It will be apparent from the above description of the embodiment of the present invention that, in the power generation system having the two output voltages of 12 volts and 24 volts, a controlled voltage of appropriate value can be always charged in the second battery provided for the starting purpose only. Therefore, the problem of overcharging or undercharging the second battery can be obviated to improve the reliability of the charging system.

In addition to the advantage described above, the present invention provides the following advantages;

(i) The power FET 300 switching in synchronism with the a.c. output waveform of the generator is turned on-off when the instantaneous generator output is zero. Therefore, no switching noise is produced. Further, since the switching frequency is low, there is no problem of electromagnetic interference.

(ii) The voltage charged in the second battery 3 increases at low temperatures. Therefore, the charging efficiency is improved.

(iii) The power FET 300 is used as a power element. Therefore, the voltage drop is small when the current value is small, and a very small current can be continuously supplied even when the second battery 3 is in its full charged state.

(iv) The transistor 304 is turned off when the key switch 8 is turned off. Therefore, no discharge from the second battery 3 occurs when the engine is stopped.

Figure 6:
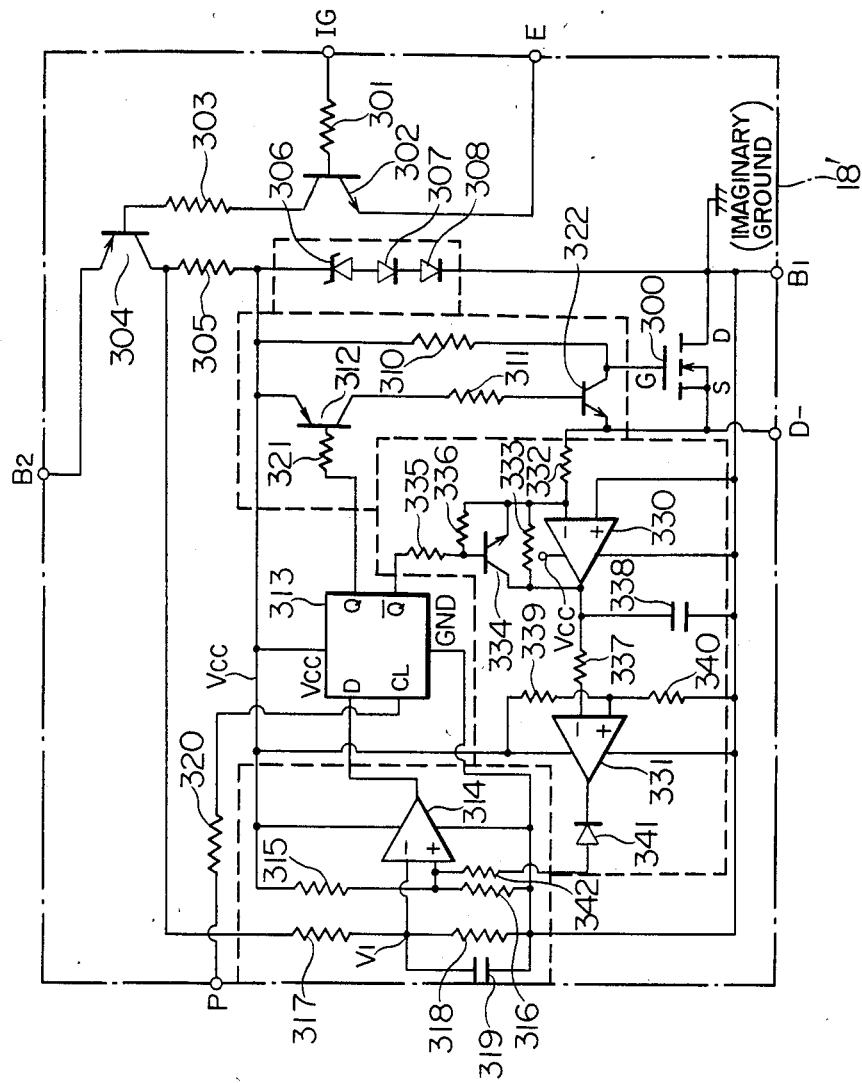
FIG. 6 is a circuit diagram showing in detail the structure of another form of the second voltage regulator employed in the present invention.

Another embodiment of the present invention will now be described. Although this another embodiment is generally similar in structure to the embodiment shown in FIG. 1, its second voltage regulator has a circuit structure different from that shown in FIG. 3. As shown in FIG. 6, this second voltage regulator 18' includes an operational amplifier 330 and a comparator 331 in addition to the circuit elements shown in FIG. 3, and the same reference numerals are used to designate the same functional parts appearing in FIG. 3.

Describing in more detail, power supply terminals of the operational amplifier 330 and comparator 331 are connected to both ends of the series connection of the Zener diode 306 and two diodes 307, 308 (three diodes 307, 308 and 309 in the case of FIG. 3). The operational amplifier 330 is connected at its minus (−) input terminal to the terminal D- through a resistor 332 and at is plus (+) input terminal to the terminal $B_1$. A resistor 333 is connected between the minus (−) input terminal and the output terminal of the operational amplifier 330, and an NPN transistor 334 is connected at its emitter and collector to both ends respectively of the resistor 333. The NPN transistor 334 is connected at its base to the output terminal $\overline{Q}$ of the D-type flip-flop 313 through a resistor 335, and a resistor 336 is connected between the base and the emitter of the NPN transistor 334.

The output terminal of the operational amplifier 330 is connected to the minus (−) input terminal of the comparator 331 through a resistor 337, and a capacitor 338 is connected between the output terminal of the operational amplifier 330 and the terminal $B_1$. Resistors 339 and 340 are connected in series to divide the voltage Vcc, and the plus (+) input terminal of the comparator 331 is connected to the connection point between these resistors 339 and 340. The output terminal of the comparator 331 is connected to the plus (+) input terminal of the comparator 314 through a diode 341 and a resistor 342 connected in series.

In the second voltage regulator 18' having the structure shown in FIG. 6, the combination of the operational amplifier 330, comparator 331 and NPN transistor 334 acts as a current control circuit controlling the current flowing through the power FET 300. That is, in response to the application of the $\overline{Q}$ signal (which is generated only when the power FET 300 is in its on state) from the D-type flip-flop 313, the drain-source voltage of the conducting power FET 300 is detected and converted into the drain current (main current), and, when the value of the main current is larger than a predetermined setting, a signal is applied to the comparator 331 to decrease the regulated output voltage.

Thus, the second voltage regulator 18' in the second embodiment of the present invention has another function of limiting the current supplied to the second battery 3, in addition to a function similar to that described with reference to FIG. 3. This another function will be described in detail.

The operational amplifier 330 is connected at its plus or non-inverted input terminal (+) to the drain of the power FET 300 and at its minus or inverted input terminal (−) to the source of the power FET 300 through the resistor 332. When the power FET 300 is in its on state, the operational amplifier 330 amplifies the drain-source voltage of the power FET 300. This voltage amplification degree $A_{NF}$ is expressed as follows:

$$A_{NF} = \frac{V_o}{V_{D-}} = -\frac{R_{333}}{R_{332}} \qquad (3)$$

where $V_o$: Output voltage of the operational amplifier 330 acting as an inverting amplifier $V_{D-}$: Drain-source voltage of the power FET 300

$R_{333}$: Resistance value of the resistor 333

$R_{332}$: Resistance value of the resistior 332

From the equation (3), the output voltage Vo of the operational amplifier 330 is expressed as follows:

$$V_o = -\frac{R_{333}}{R_{332}} \times V_{D-} \qquad (4)$$

The drain-source voltage $V_{D-}$ of the power FET 300 is given by $$V_{D-} = -R_{ON} \cdot I \qquad (5)$$

where $R_{ON}$: On-state resistance of the power FET 300

I: Main current flowing between the drain and the source of the power FET 300

By substituting the value of $V_{D-}$ given by the equation (5) into the equation (4), Vo is expressed as follows:

$$V_o = \frac{R_{333}}{R_{332}} \cdot R_{ON} \cdot I \qquad (6)$$

From the equation (6), it can be seen that a change in the main current I flowing between the drain and the source of the power FET 300 is replaced by a change in the output voltage Vo of the operational amplifier 330. The output voltage Vo of the operational amplifier 330 acting as the inverting amplifier is smoothed by the smoothing circuit composed by the resistor 337 and the capacitor 338 and is applied to the minus or inverted input terminal (−) of the comparator 331. The voltage Vcc is divided by the resistors 339 and 340, and the divided voltage is applied to the plus or non-inverted input terminal (+) of the comparator 331. By suitably selecting the ratio between the resistance values of the resistors 339 and 340, the mean value of the main current flowing between the drain and the source of the power FET 300 can be limited as desired.

When now the value of the main current flowing between the drain and the source of the power FET 300 is larger than a setting, the voltage applied to the inverted input terminal (−) of the comparator 331 is higher than that applied to the non-inverted input terminal (+), and "0" appears at the output terminal of the comparator 331. As a result, current flows into the output terminal of the comparator 331 through the resistor 342 and diode 341, and the voltage divided by the resistors 315 and 316 is decreased to decrease the initially set regulated voltage. As a result, the conduction ratio of the main current flowing between the drain and the source of the power FET 300 is decreased. Thus, the value of the main current fflowing between the drain and the source of the power FET 300 is limited to the setting, and the main current of larger value does not flow. On the other hand, when the mean value of the main current flowing between the drain and the source of the power FET 300 is smaller than the setting, "1" appears at the output terminal of the comparator 331, and the diode 341 is cut off. As a result, no current flows through the resistor 342, and no change occurs in the divided voltage divided by the resistors 315 and 316.

The current limiting circuit described above is required to operate only when the power FET 300 is in its on state. Therefore, the current limiting circuit is connected to the output terminal $\overline{Q}$ of the D-type flip-flop 313. An output signal of "0" level appears at the output terminal $\overline{Q}$ of the D-type flip-flop 313 when the power FET 300 is in its on state, while an output signal of "1" level appears when the power FET 300 is in its off state. In the off state of the power FET 300, base current is supplied to the transistor 334 through the resistor 335 to turn on the transistor 334. In this case, the output voltage Vo of the operational amplifier 330 acting as the inverting amplifier is expressed as follows:

$$Vo = V_{CE(sat)} \approx 0 \qquad (7)$$

where
$V_{CE(sat)}$: Collector-emitter voltage of the transistor 334 when turned on Thus, the output voltage Vo of the operational amplifier 330 is almost 0 volts. On the other hand, in the on state of the power FET 300, an output signal of "0" level appears at the output terminal $\overline{Q}$ of the D-type flip-flop 313, and no base current is supplied to the transistor 334. The transistor 334 is turned off, and the operational amplifier 330 operates normally as the inverting amplifier.

It will be apparent from the above description of the second embodiment of the present invention that, in the power generation system generating the two output voltages of 12 volts and 24 volts, the value of a maximum current supplied to the second battery 3, whose voltage is higher than that of the first battery 2, can be limited to a predetermined setting, so that objectionable thermal breakdown of the associated elements including the second rectifier 15 and power FET 300 can be reliably prevented, and wasteful generation of power can also be minimized. Therefore, the vehicular power supply system according to the present invention can improve the efficiency of power generation.

We claim:

1. A vehicular power supply system comprising:
   a generator including a first set of armature windings and a second set of armature windings electrically isolated from each other and a field winding supplying magnetic flux to said first and a second sets of armature windings;
   first rectifier means connected to the first set of armature windings of said generator to convert a first a.c. output of said first set of armature windings into a first d.c. voltage;
   second rectifier means connected to the second set of armature windings of said generator to convert a second a.c. output of said second set of armature windings into a second d.c. voltage;
   a first battery connected to an output terminal of said first rectifier means to supply power to an electrical load connected thereto and to be charged by the output of said first rectifier means;
   a second battery connected in series with said first battery and connected also to an output terminal of said second rectifier means to supply power to an electrical load connected thereto and to be charged by the output of said second rectifier means;
   a first voltage regulator detecting the terminal voltage of said first battery thereby controlling current supplied to the field winding of said generator so as to maintain constant the terminal voltage of said first battery; and
   a second voltage regulator connected between said second battery and said second rectifier means to regulate the charged voltage of said second battery, said second voltage regulator including switching means connected between said second battery and said second rectifier means, means for comparing the voltage of said second battery with a predetermined reference value, and conduction rate control means for controlling on-off of said switching means according to the result of comparison by said comparing means, said second voltage regulator further including means for transferring the result of comparison from said comparing means to said conduction ratio control means in synchronism with generating timing of a clock signal provided by the a.c. output of one of the phases of the second set of armature windings of said generator.

2. A vehicular power supply system according to claim 1, wherein said system further includes a constant voltage circuit having at least one temperature-sensitive element which generates a high output voltage at low temperature, and circuit means for dividing the output voltage of said constant voltage circuit, the divided voltage being said predetermined reference value.

3. A vehicular power supply system according to claim 1, wherein said switching means in said second voltage regulator is a field effect transistor.

4. A vehicular power supply system comprising:
   a generator including a first set of armature windings and a second set of armature windings electrically isolated from each other and a field winding supplying magnetic flux to said first and second sets of armature windings;

first rectifier means connected to the first set of armature windings of said generator to convert a first a.c. output of said first set of armature windings into a first d.c. voltage;

second rectifier means connected to the second set of armature windings of said generator to convert a second a.c. output of said second set of armature windings into a second. d.c. voltage;

a first battery connected to an output terminal of said first rectifier means to supply power to an electrical load connected thereto and to be charged by the output of said first rectifier means;

a second battery connected in series with said first battery and connected also to an output terminal of said second rectifier means to supply power to an electrical load connected thereto and to be charged by the output of said second rectifier means;

a first voltage regulator detecting the terminal voltage of said first battery thereby controlling current supplied to the field winding of said generator so as to maintain constant the terminal voltage of said first battery; and a second voltage regulator connected between said second battery and said second rectifier means to regulate the charged voltage of said second battery, said second voltage regulator including switching means connected between said second battery and said second rectifier means, means for comparing the voltage of said second battery with a predetermined reference value, and conduction rate control means for controlling on-off of said switching means according to the result of comparison by said comparing means, said second voltage regulator further including means for detecting one of a means current and a mean voltage of said second battery, and means for decreasing the conduction ratio of said conduction ratio control means only when the output of said detecting means exceeds a predetermined value.

5. A vehicular power supply system according to claim 4, wherein said switching means is a field effect transistor, and said detecting means includes an amplifier amplifying an on-state drain-source voltage of said field effect transistor and a smoothing circuit smoothing the output voltage of said amplifier.

6. A vehicular power supply system according to claim 5, wherein said field effect transistor is an N-channel field effect transistor connected at its source to the negative terminal of said second rectifier means and at its drain to the negative terminal of said second battery, and said amplifier acts as an inverting amplifier connected at its non-inverted input terminal and its negative power supply terminal to the negative terminal of said second battery and having a first resistor connected between its inverted input terminal and the source of said field effect transistor and a second resistor connected between its output terminal and its inverted input terminal.

* * * * *